Patented Apr. 6, 1948

2,439,237

UNITED STATES PATENT OFFICE 2,439,237

PREPARATION OF TETRAHALOGENATED BENZENES AND BENZOIC ACIDS

William E. Cass, Schenectady, N. Y., assignor to General Electric Company, a corporation of New York No Drawing. Application January 15, 1946, Serial No. 641,408

3 Claims. (Cl. 260—650)

This invention relates to methods of preparing 2,3,4,5-tetrahalogenated benzoic acids and 1,2,3,4,-tetrahalogenated benzenes (2,3,4,5,-tetrahalogenated benzenes). Specifically, it relates to the method which comprises heating, under superatmospheric pressure, a mixture comprising (1) water and (2) a compound selected from the class consisting of tetrahalogenated phthalic acid and tetrahalogenated phthalic anhydride, said anhydride forming the corresponding tetrahalogenated phthalic acid in the presence of the water, thereby to obtain products corresponding to the general formula

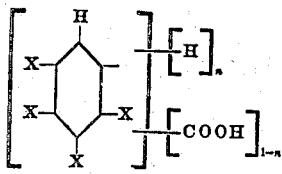

where X is a halogen and n is one of the following: 0,1, and thereafter isolating the said products from the reaction mass. In the above formula, when n=0, only one hydrogen will be attached to the benzene ring.

More particularly, this invention is concerned with a method of transforming a tetrahalogenated phthalic acid to a compound selected from the class consisting of 2,3,4,5-tetrahalogenated benzoic acid and 1,2,3,4,-tetrahalogenated benzene, which method comprises heating, under superatmospheric pressure, a mixture comprising (1) water and (2) a compound selected from the class consisting of tetrahalogenated phthalic acid and tetrahalogenated phthalic anhydride, said anhydride forming the corresponding tetrahalogenated phthalic acid in the presence of the water, the heating being conducted at a temperature and for a length of time sufficient at least partly to decarboxylate the tetrahalogenated phthalic acid, and thereafter isolating the decarboxylated tetrahalogenated phthalic acid from the reaction mass.

Other method features within the scope of the present invention are based on my discovery that by employing a basic material in the reaction mixture, and by controlling the temperature conditions as well as the time of reaction, I can obtain increased yields of either the tetrahalogenated benzene or the tetrahalogenated benzoic acid as may be desired.

Considerable difficulty previously has been experienced in preparing the 1,2,3,4,-tetrahalogenated benzene and the 2,3,4,5,-tetrahalogenated benzoic acid. C. van de Bunt [Rec. Trav. Chim., 48, 121 (1929)] prepared 2,3,4,5-tetrabromobenzoic acid by oxidizing 2,3,4,5-tetrabromobenzaldehyde. This method, however, is quite complicated and impractical for large-scale production. P. Tust [Berichte, 20, 2439 (1887)] heated tetrachlorophthalic acid with two to three times its weight of acetic acid in a sealed tube three to four hours at 300° C. to obtain a product melting at 186° C. which he claimed was tetrachlorobenzoic acid. The yield obtained was not mentioned. However, using acetic acid as the reaction medium, under the temperature-time conditions (3 hours in a 250° C. oven) employed in my invention, the yield of tetrachlorobenzoic acid obtained was so small as to be negligible. 1,2,3,4-tetrachlorobenzene has been prepared, according to the literature [see J. Chem. Soc., 87, 1365 (1905); Ann., 192, 238 (1878); Recevil., 39, 741 (1920)]. However, the methods employed to prepare the 1,2,3,4,-tetrahalogenated benzenes, specifically 1,2,3,4-tetrachlorobenzene, are quite different from those of the present invention and are so complicated as to render them impractical.

I have found that 1,2,3,4,-tetrahalogenated benzenes, specifically 1,2,3,4,-tetrachlorobenzene, or 2,3,4,5-tetraholagenated benzoic acids, specifically 2,3,4,5-tetrachlorobenzoic acid, can be prepared in good yields and economically from either tetrahalogenated phthalic acid or tetrahalogenated phthalic anhydride, by heating the tetrahalogenated phthalic acid or anhydride with water (in the presence of the water the tetrahalogenated phthalic anhydride is hydrolyzed to the tetrahalogenated phthalic acid), under superatmospheric pressure, at a temperature and for a period of time sufficient partly (if the tetrahalogenated benzoic acid is desired) or completely (if the tetrahalogenated benzene is desired) to decarboxylate the tetrahalogenated phthalic acid present in the reaction mixture.

The basic materials which may be employed in practicing the more specific embodiments of my invention include the inorganic bases, for instance, the alkali-metal hydroxides, e. g., potassium hydroxide, sodium hydroxide, etc., alkaline-earth metal hydroxides, e. g., calcium hydroxide, barium hydroxide, etc., the carbonates and bicarbonates of such bases (both hydrous and anhydrous forms), e. g., sodium carbonate, potassium carbonate, calcium bicarbonate, sodium bicarbonate, potassium bicarbonate, etc.; and organic bases, for instance trimethyl amine, tributyl amine, dimethyl aniline, quinoline, pyricine, etc. Mixtures of two or more of the aforementioned basic materials may also be employed. I prefer to use inorganic bases since the organic bases tend to give colored products.

Although either the tetrahalogenated phthalic acid or anhydride may be employed as the starting material, for convenience, I prefer to use the tetrahalogenated phthalic anhydride. Regardless of whether the acid or anhydride is employed in the reaction mixture, it is apparent that only the tetrahalogenated phthalic acid can undergo either partial decarboxylation to the tetrahalogenated benzoic acid, or complete decarboxylation to the tetrahalogenated benzene. When the tetrahalogenated phthalic anhydride is employed, in the presence of water, the anhydride is hydrolyzed to the tetrahalogenated phthalic acid thereby permitting partial decarboxylation or complete decarboxylation, depending on the conditions. The various tetrahalogenated derivatives of phthalic acid and phthalic anhydride may be employed in this invention. e. g., the tetrachloro-, the tetraiodo-, the tetrabromo- and tetrafluoro-substituted phthalic acid or anhydride. When these tetrahalogenated derivatives are employed, the products obtained will be the 1,2,3,4,-tetrachloro-, the 1,2,3,4,-tetraiodo-, the 1,2,3,4,-tetrabromo-, and the 1,2,3,4,-tetrafluoro-substituted benzenes and the 2,3,4,5-tetrachloro-, the 2,3,4,5-tetraiodo-, the 2,3,4,5-tetrabromo-, and the 2,3,4,5-tetrafluoro-substituted benzoic acids.

The temperature ranges employed in practicing my invention may be varied over a broad range. Generally the temperatures used will depend on whether the tetrahalogenated benzene or the tetrahalogenated benzoic acid is desired. When a basic material is employed in the reaction mixture, the temperature and time of the reaction will determine whether the tetrahalogenated benzene or benzoic acid is obtained in optimum yields. To obtain good yields of the tetrahalogenated benzene, a basic material is used, while the temperatures employed will vary from about 220–280° C., preferably within the range of 240–260° C., depending on the time of reaction. Higher temperatures may be employed with a subsequent reduction in the time of reaction in accordance with the well-known law of chemical reactions. When it is desired to obtain the tetrahalogenated benzoic acid, the temperatures employed may be varied from 150–280° C. depending on whether a basic material is employed in the reaction. When no basic material is used, the usual temperature range will vary from approximately 220–280° C., or even higher. If a basic material is employed, the usual temperature range will vary from about 150–210° C.; higher temperatures lead to the formation of increased amounts of tetrahalogenated benzene.

The time of heating the reaction mixture may be varied depending, for example, on two factors: (1) the temperature employed in effecting the reaction and (2) the presence or absence of a basic material. When the reaction involving the preparation of the tetrahalogenated benzene is carried out within the temperature range of about 220–280° C., using a basic material, the time of heating may be varied, for instance, from one-quarter hour to eight hours, or even longer. The preferable heating time is from about one to four hours, when the more limited range of 240–260° C. is employed.

In the preparation of the tetrahalogenated benzoic acid, the time of reaction, in the case when the basic material is absent, may be varied, for instance, from one quarter to eight hours or even longer within the temperature range of approximately 220–280° C. The preferable heating time is from one to four hours, especially when a temperature range of from 240–260° is employed. When the basic material is employed in the reaction, the time of reaction may be varied from about one-quarter to eight or ten hours or more at the temperature range of 150–210° C. Good yields are obtained when the heating at from 150–210° C. is for a period of about from four to eight hours. Longer times of reaction at the upper limits of this temperature range (150–210° C.) result in the formation of larger amounts of the tetrahalogenated benzene.

In many cases the time of heating will depend on such factors as the type of reactor in which the pressure reaction is carried out. Thus if the pressure reactor has very thick walls, and the heating is applied externally, it may be necessary to heat the reaction mixture longer so that the mixture is at the desired temperature for a sufficient length of time to obtain the optimum yield.

In the reactions described in the examples which follow, the pressure reactor was a glass-lined steel bomb, the walls of which were fairly thick. When the bomb was heated in the oven at the particular temperature specified in these examples, the reaction mixture was not at that temperature for the full time therein stated. This will be apparent when the heating schedule is examined in the cases where the example called for placing the bomb in a 250° C. oven for three hours and in a 200° C. oven for 6 hours. By inserting a thermocouple in the center of the bomb and recording the temperatures obtained at various periods during the three-hour heating time, the following rate of heating was observed in each of the above cases:

| Total Time Minutes | Rate of Heating of Bomb in 250° C. Oven Temperature, ° C. |
| --- | --- |
| 0 | 25 |
| 35 | 172 |
| 60 | 214 |
| 105 | 242 |
| 130 | 245 |
| 150 | 247 |
| 180 | 249 |

| Total Time Minutes | Rate of Heating of Bomb in 200° C. Oven Temperature, ° C. |
| --- | --- |
| 0 | 25 |
| 30 | 110 |
| 60 | 157 |
| 100 | 185 |
| 130 | 190 |
| 160 | 193 |
| 180 | 195 |
| 240 | 198 |

The above heating schedules indicate that the reaction mixtures were within about 10–15° C. of the desired temperature for at least about half the time that the bomb was in the oven at the respective temperature.

The amount of water employed in the reaction mixture may be varied in all proportions based on the weight of the tetrahalogenated phthalic acid or anhydride employed. I have found that the more dilute the reaction mixture, the better is the yield of the decarboxylated material, especially the tetrahalogenated benzoic acid. On a weight basis, optimum results are obtained when from one to ten parts water are employed for each part of the tetrahalogenated phthalic acid or anhydride present in the reaction mixture. For purposes of economy, as will be obvious, too much water is not desirable. Actually I prefer that, on a weight basis, from two to seven parts water be employed for each part of the acid or anhydride present in the reaction mixture.

The pressures encountered in these reactions will vary depending, for example, on the temperatures employed. The approximate pressures developed at some of the temperatures employed in this invention were calculated. These pressures are shown in the following table:

| T° C. | Approximate Pressure in Pounds per Square inch |
| --- | --- |
| 150 | 410 |
| 200 | 690 |
| 250 | 1,110 |

The amount of basic material employed in the more specific aspects of my invention may vary within a wide range. Thus for each mol of the tetrahalogenated phthalic acid or anhydride used in the reaction mixture, from about 0.001 to about 6 to 8 or more mols of the basic material may be employed. The preferable range is from approximately 0.01 to 2 mols of basic material per mol of the tetrahalogenated phthalic acid or anhydride.

In order that those skilled in the art may better understand how the present invention may be practiced, the following examples are given by way of illustration and not by way of limitation. All parts are by weight:

*Example 1*

| | Parts |
| --- | --- |
| Tetrachlorophthalic anhydride | 28.6 |
| Water | 100.0 |

The above ingredients were placed in a glass-lined steel bomb, the bomb sealed and placed in a 200° C. oven for 6¾ hours. After this period of time, the bomb was removed from the oven and allowed to cool for about 15 hours. The bomb was opened and the evolved carbon dioxide was permitted to escape and the contents of the bomb removed. Excess water was added to the reaction mixture and the crystalline material obtained was filtered. This material was heated for 2 hours in a 125° C. oven to effect the transformation to tetrachlorophthalic anhydride of any tetrachlorophthalic acid present in the reaction mixture. (This procedure was employed in all the following examples to convert any tetrachlorophthalic acid to the anhydride.) The yield of product was 27 parts by weight. From the calculated acid numbers for tetrachlorophthalic anhydric (392.6) and tetrachlorobenzoic acid (216), it was determined that since the obtained product had an acid number of 323, 39.5% of the product consisted of tetrachlorobenzoic acid. This corresponds to a conversion of about 41.2% of the tetrachlorophthalic anhydride. A portion of the product was recrystallized from a 50% acetone-water mixture to yield pure tetrachlorobenzoic acid in the form of long, white, needle-like crystals melting at 193–194° C. and having an acid number of 216. Further recrystallizations did not change this melting point.

*Example 2*

| | Parts | Approx. Mol Ratio |
| --- | --- | --- |
| Tetrachlorophthalic anhydride | 28.6 | 1 |
| Potassium carbonate | 1.0 | 0.0725 |
| Water | 100.0 | |

The above ingredients were reacted in a bomb similarly as in Example 1, except that the time of heating in the instant example was for 6½ hours instead of 6¾ hours. The bomb was cooled and the contents were removed. The reaction mixture was worked up as in Example 1 with the exception that a small amount of hydrochloric acid was added before filtration to precipitate the insoluble organic acids from the soluble potassium salts. The product melted at 175–191° C. and its acid number was 236. From this it was calculated that 89% of the product consisted of tetrachlorobenzoic acid. A portion of the product was recrystallized from an acetone-water mixture to yield white, needle-like crystals melting at 193–194° C. and having an acid number of 216. A second recrystallization did not raise the melting point. This example indicates the pronounced catalytic effect of a small amount of a basic material at the temperature employed in the reaction.

*Example 3*

| | Parts | Approx. Mol Ratio |
| --- | --- | --- |
| Tetrachlorophthalic anhydride | 28.6 | 1 |
| Sodium hydroxide | 4.0 | 1 |
| Water | 100.0 | |

The above ingredients were heated in a bomb in the same manner as in Example 1, except that the time of heating was for 6 hours instead of 6¾ hours. The reaction mixture was removed from the bomb, water and dilute alkali were added and the mixture heated to boiling. The product was precipitated from the hot solution of sodium salts by the addition of excess hydrochloric acid. The precipitated product was filtered, washed with water and dried about two hours at 125° C. There were thus obtained 25.5 parts of a product melting at 185–190° C. and having an acid number of 224. This represented 94% of the theoretical yield of the tetrachlorobenzoic acid based on the amount of tetrachlorophthalic anhydride originally employed. The product was recrystallized from a solution of water and acetone to yield pure tetrachlorobenzoic acid (M. P. 193–194° C. and acid number 216.)

*Example 4*

| | Parts | Approx. Mol Ratio |
| --- | --- | --- |
| Tetrachlorophthalic anhydride | 28.60 | 1.00 |
| Pyridine | 4.91 | 0.67 |
| Water | 100.00 | |

The above ingredients were heated under pressure in a manner similar to that disclosed in Example 1 except that the heating was conducted for only 6 hours instead of 6¾ hours. Water and dilute alkali were added to the cooled reaction product and the mixture heated to boiling. The solution turned dark brown in color, indicating that colored by-products were produced in this reaction. By the addition of excess hydrochloric acid to the hot solution of sodium salts, precipitation of the product was obtained. The precipitated product was crystalline and yellow-brown in color, melted at 192.5–193.5° C. and had an acid number of 224. The product obtained consisted of about 95.5% tetrachlorobenzoic acid. The product was dissolved in acetone and treated with decolorizing charcoal. The mixture was filtered and water added to the filtrate. This mixture was heated to boiling and then allowed to cool. There were thus obtained almost white needle-like crystals melting at 193–194° C. and having an acid number of 216. A mixed melting point with the recrystallized product of Example 3 showed no depression.

Example 5

|  | Parts | Approx. Mol Ratio |
| --- | --- | --- |
| Tetrachlorophthalic anhydride | 57.2 | 1.00 |
| Sodium hydroxide | 7.5 | 0.94 |
| Water | 200.0 |  |

The above reactants were placed in a glass-lined steel bomb, the bomb sealed and placed in a 200° C. oven for 8 hours. After allowing the bomb to cool, the contents were removed and 1000 parts of water and excess dilute sodium hydroxide were added to the reaction mixture and the mixture heated to boiling until solution occurred. The resulting solution had a strong odor of tetrachlorobenzene (probably formed by the decarboxylation of the tetrachlorobenzoic acid). After filtration of the hot solution, excess hydrochloric acid was added to the filtrate. The product which precipitated was removed by filtration, washed with water, and dried for two hours at 125° C. This drying procedure appeared to remove the chlorinated benzene by-product. There were thus obtained 43 parts of a product having a melting point of 187–191° C. an an acid number of 221. On analysis this was found to represent a yield of about 80% tetrachlorobenzoic acid based on the amount of tetrachlorophthalic anhydride employed in the original reaction. When a 0.6 mol ratio of potassium hydroxide was employed in place of the sodium hydroxide in this example, and the heating time was for 7 hours instead of 8 hours, the yield of tetrachlorobenzoic acid was about 87.5% of the theoretical.

Example 6

|  | Parts | Approx. Mol Ratio |
| --- | --- | --- |
| Tetrachlorophthalic anhydride | 28.6 | 1 |
| Sodium hydroxide | 4.0 | 1 |
| Water | 200 |  |

The above ingredients were heated under pressure similarly as in Example 5 except that the heating time was for 7 hours instead of the 8 hours employed in Example 5. The cooled reaction mixture was removed from the bomb, diluted with 1000 parts water and excess dilute sodium hydroxide and the mixture heated to boiling. The resulting solution had only a slight odor of tetrachlorobenzene. The hot solution was filtered and excess hydrochloric acid was added to the filtrate. The precipitate which resulted was removed by filtration, washed with cold water and dried. There were thus obtained 24 parts of a product melting at 193–194° C. and having an acid number of 216, i. e., essentially pure tetrachlorobenzoic acid. This amount of product corresponded to 92.5% of the theoretical yield of tetrachlorobenzoic acid based on the amount of tetrachlorophthalic anhydride employed in the original reaction.

Example 7

|  | Parts | Approx. Mol Ratio |
| --- | --- | --- |
| Tetrachlorophthalic anhydride | 28.6 | 1 |
| Sodium hydroxide | 4.0 | 1 |
| Water | 200 |  |

The above ingredients were placed in a glass-lined steel bomb and heated in a 150° C. oven for 32 hours (the actual time at which the reaction mixture was at the above temperature was for about 25–30 hours). The reaction mixture was removed from the bomb at the end of this period and diluted with about 1000 parts of water containing a slight excess of sodium hydroxide. The mixture was heated to boiling until solution occurred. The solution was filtered and excess hydrochloric acid was added to the hot filtrate. After cooling, the precipitated product was filtered, washed with water and dried, first at room temperature and then at 125° C. for two hours. From the acid number (366), it was calculated that of the 27 parts by weight of product obtained, about 14.7% was 2,3,4,5-tetrachlorobenzoic acid. Recrystallization of the above product from a water-acetone mixture resulted in a yield of almost pure white crystals melting at 192–193.5° C. and having an acid value of 215.5, proving that 2,3,4,5-tetrachlorobenzoic acid had been obtained.

Example 8

|  | Parts | Approx. Mol Ratio |
| --- | --- | --- |
| Tetrachlorophthalic anhydride | 28.6 | 1 |
| Sodium hydroxide | 4.0 | 1 |
| Water | 200.0 |  |

The above ingredients were heated similarly as was done in Example 7 except that the time of heating was for 3 hours instead of 32 hours and the temperature of the oven was 250° C. instead of 150° C. as in Example 7. After cooling, the bomb was opened and 1000 parts water were added to the reaction mixture. An amount of sodium hydroxide sufficient to render the mixture distinctly alkaline was added and the mixture was heated to boiling. The aqueous layer was decanted from the resulting, oily, alkali-insoluble layer and the oily layer was washed repeatedly with hot water. On cooling, the oil solidified, giving light tan crystals (about 19.5 parts by weight) in a yield of about 90.5% of the theoretical amount of 1,2,3,4-tetrachlorobenzene. The product melted at 46–47° C. (Bellstein discloses the melting point as 45–46°

C.) It is therefore apparent that essentially pure 1,2,3,4-tetrachlorobenzene was obtained by the above reaction.

Example 9

| | Parts |
|---|---|
| Tetrachlorophthalic anhydride | 28.6 |
| Water | 200 |

The above ingredients were placed in a glass-lined steel bomb and heated for 3 hours in a 250° C. oven. The cooled reaction mixture was removed from the bomb and dissolved in alkali; the product was precipitated with hydrochloric acid, filtered and dried as in Example 7. There were thus obtained about 24.5 parts (about 94.5% of the theoretical yield) of almost pure 2,3,4,5-tetrachlorobenzoic acid melting at 191–194° C. and having an acid number of 218.

In the following examples tetrachlorophthalic anhydride and tetrachlorophthalic acid were reacted in the presence of glacial acetic acid to determine the efficacy of using the basic concepts disclosed by Tust (see supra).

Example 10

| | Parts |
|---|---|
| Tetrachlorophthalic anhydride | 28.6 |
| Glacial acetic acid | 209.8 |

The above ingredients were heated exactly as in Example 9. The reaction mixture was removed from the steel bomb and 1500 parts water were added. The resulting mixture was cooled and filtered. The crude solid product obtained by the filtration was dissolved in about 1000 parts of a dilute aqueous solution of sodium hydroxide by heating, and the resulting solution was filtered. Excess hydrochloric acid was added to the hot filtrate. Upon cooling, the precipitate thereby obtained was filtered and dried, first at room temperature and then for two and one-half hours at 125° C. There were thus obtained 24 parts of a product melting at 253–255.5° C. and having an acid number of 389. This was substantially pure unchanged tetrachlorophthalic anhydride, proving that at 250° C. little, if any, tetrachlorobenzoic acid was formed in an acetic acid medium.

Example 11

| | Parts |
|---|---|
| Tetracholorophthalic anhydride | 28.6 |
| Glacial acetic acid | 104.9 |

The above ingredients were heated in a bomb (under superatmospheric pressure) for 6½ hours in a 200° C. oven. The bomb and its contents were cooled to room temperature, the contents removed and excess water added to the reaction mixture. The crystalline material present was filtered and dried at 125° C. for 2 hours. The product thus obtained had an acid number of 392.5 and a melting point of 250–256° C. The original tetrachlorophthalic anhydride which was greater than 99% pure, had an acid number of 393 and a melting point of 255–257° C., indicating that scarcely any of the tetrachlorophthalic anhydride had been converted to the tetrachlorobenzoic acid. When tetrachlorophthalic acid (actually tetrachlorophthalic acid semi-hydrate was used) was employed in place of the tetrachlorophthalic anhydride, substantially the same result was obtained, namely, hardly any of the tetrachlorophthalic acid was converted to tetrachlorobenzoic acid.

What I claim as new and desire to secure by Letters Patent of the United States is:

1. A method of preparing 1,2,3,4-tetrachlorobenzene which comprises heating, under superatmospheric pressure at a temperature of from 220° to 280° C., a mixture comprising (1) water, (2) a compound selected from the class consisting of tetrachlorophthalic acid and tetrachlorophthalic anhydride, said anhydride forming the corresponding tetrachlorophthalic acid in the presence of the water, and (3) an inorganic basic material, and thereafter isolating 1,2,3,4-tetrachlorobenzene from the reaction mass.

2. A method of preparing 1,2,3,4-tetrachlorobenzene which comprises heating, under superatmospheric pressure, at a temperature of from 220–280° C. for from about one-quarter to eight hours, a mixture comprising water, sodium hydroxide and tetrachlorophthalic anhydride, and thereafter isolating 1,2,3,4-tetrachlorobenzene from the reaction mass.

3. A method of preparing 1,2,3,4-tetrachlorobenzene which comprises (1) heating under superatmospheric pressure at a temperature of about 250° C. for approximately 3 hours, a mixture comprising water, sodium hydroxide and tetrachlorophthalic anhydride, the latter two ingredients being present in approximately equal molar proportions, (2) further heating the reaction mass with an additional amount of an aqueous solution of sodium hydroxide sufficient to render the reaction mass distinctly alkaline, (3) removing the oily alkali-insoluble layer from the reaction product obtained in step (2), and (4) isolating 1,2,3,4-tetracholorbenzene from the mass.

WILLIAM E. CASS.

REFERENCES CITED

The following references are of record in the file of this patent:

UNITED STATES PATENTS

| Number | Name | Date |
|---|---|---|
| 1,885,834 | Jaeger | Nov. 1, 1932 |
| 1,892,766 | Jaeger | Jan. 3, 1933 |
| 1,939,212 | Jaeger | Dec. 12, 1933 |
| 1,953,231 | Jaeger | Apr. 3, 1934 |
| 1,964,516 | Jaeger | June 26, 1934 |
| 2,063,365 | Conover | Dec. 8, 1936 |